Figure 1:
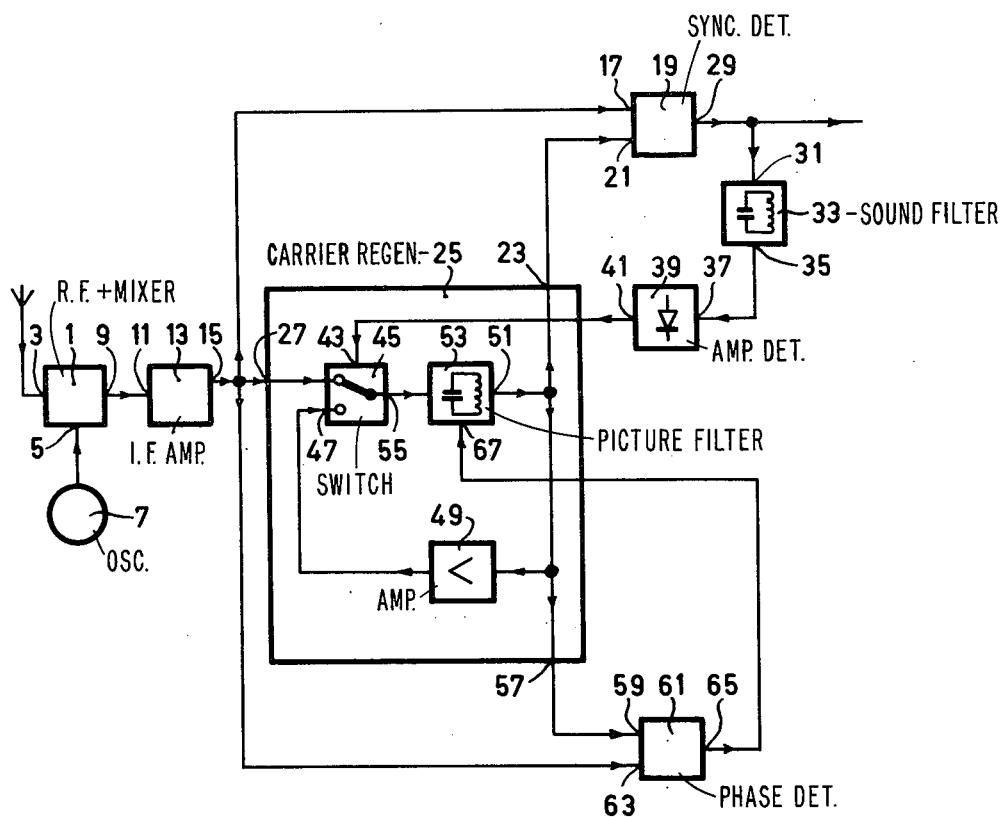

United States Patent [19]
von Nikelsberg

[11] 3,962,533
[45] June 8, 1976

[54] TELEVISION RECEIVER
[75] Inventor: Karl Frans Nickl von Nikelsberg, Eindhoven, Netherlands
[73] Assignee: U.S. Philips Corporation, New York, N.Y.
[22] Filed: May 3, 1974
[21] Appl. No.: 466,712

[30] Foreign Application Priority Data
May 8, 1973 Netherlands............................ 6381

[52] U.S. Cl........................... 178/5.8 R; 178/5.8 AF
[51] Int. Cl.²........................................... H04N 5/44
[58] Field of Search......... 178/5.8 R, 5.8 A, 5.8 AF; 325/416–423

[56] References Cited
UNITED STATES PATENTS

| 3,584,141 | 12/1968 | Fujiward et al................. 178/5.8 A |
| 3,624,512 | 6/1969 | Evans........................ 178/5.8 AF X |
| 3,715,495 | 2/1973 | Takezaki et al. ................ 178/5.8 A |
| 3,737,787 | 6/1973 | Wolfram......................... 325/423 X |
| 3,742,361 | 6/1973 | Wason........................... 325/422 X |
| 3,818,353 | 6/1974 | Sakamoto....................... 325/423 X |
| 3,821,650 | 6/1974 | Kase et al. ......................... 325/423 |

Primary Examiner—Griffin Robert L.
Assistant Examiner—Aristotelis M. Psitos
Attorney, Agent, or Firm—Frank R. Trifari; Henry I. Steckler

[57] ABSTRACT

In a television receiver using synchronous detection of the I.F. signal a picture carrier regenerator is used which is active for a small deviation of the picture intermediate frequency relative to the regenerator frequency and is passive for a large deviation so that the drawbacks of both a passive and of an active regenerator are obviated.

2 Claims, 2 Drawing Figures

TELEVISION RECEIVER

The invention relates to a television receiver including a synchronous detector coupled to an output of an I.F. section and to an output of an I.F. picture carrier regenerator.

A television receiver of the kind described above is known from NTZ 1969 volume 9 page 525-530 in which different possibilities are discussed for the I.F. picture carrier regenerator.

It is an object of the invention to provide a novel possibility for the picture carrier regenerator which does not have some of the drawbacks of the known kind.

To this end a television receiver of the kind described in the preamble according to the invention is characterized in that the picture carrier regenerator (25) includes a change-over switch (45) for changing over from an active to a passive regeneration state of the picture carrier regenerator and conversely, an operation signal input (43) of said change-over switch (45) being coupled to an output (41) of a tuning detection circuit (33, 39) which circuit provides a signal rendering the picture carrier regenerator passive in case of a large deviation of the intermediate frequency of a received signal relative to the desired frequency and provides a signal rendering, the picture carrier regenerator active in case of a small deviation.

A picture carrier regenerator in a television receiver according to the invention does not have the drawback of an active regenerator where pulling in is difficult and also not the drawback of a passive regenerator where disturbing phase modulations may occur in the recovered carrier which modulations cannot even be completely avoided with a special filter and a high quality limiter.

The invention will be described in greater detail with reference to the drawing and some embodiments.

Figure 2:
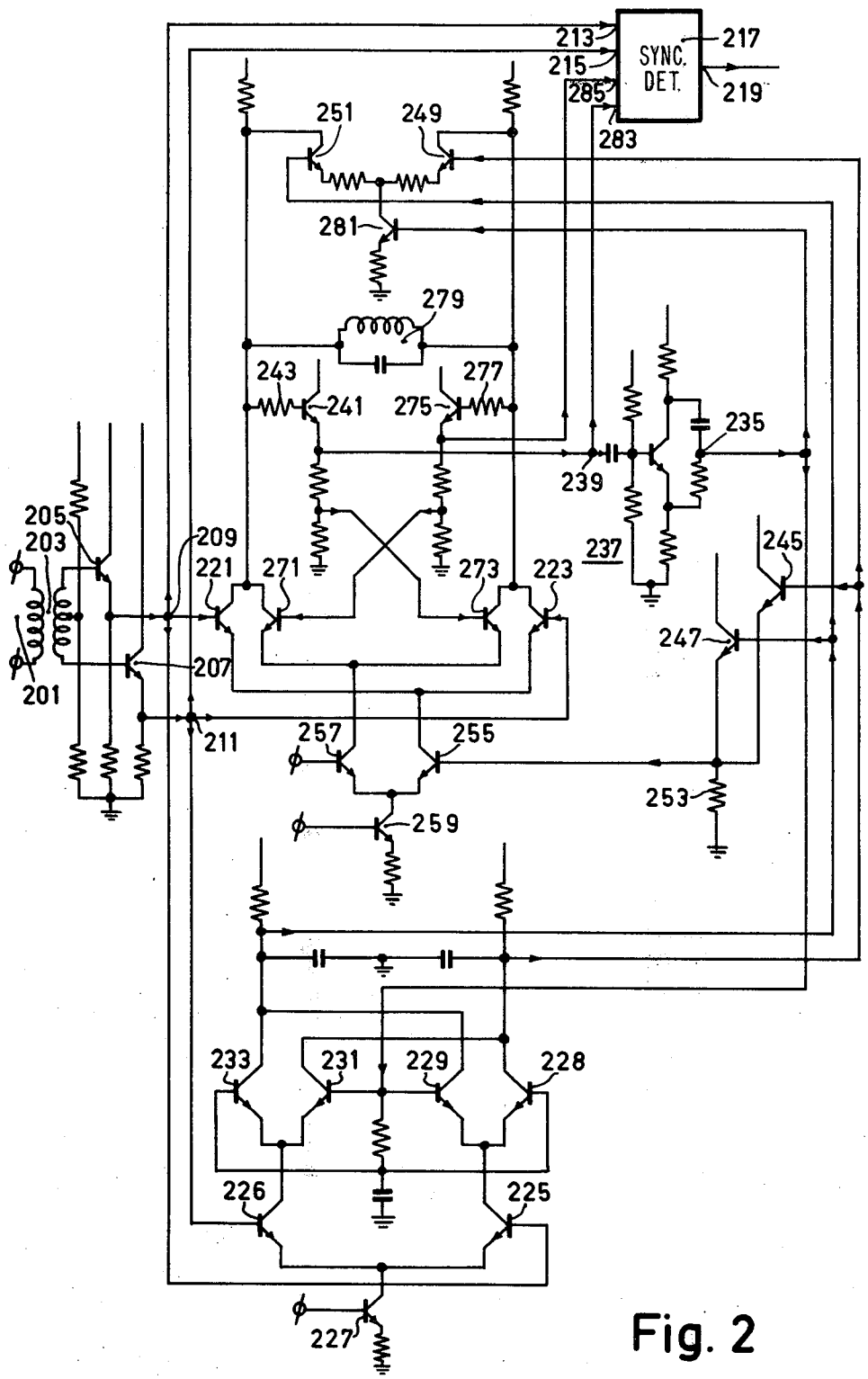

In the drawing,

FIG. 1 shows by way of a block-schematic diagram a possible embodiment of part of a television receiver according to the invention and FIG. 2 shows by way of a principle circuit diagram another possible embodiment of part of a television receiver according to the invention.

In FIG. 1 an RF and mixing section 1 has an input 3 for applying a received television signal, an input 5 for applying an oscillator signal originating from an oscillator 7 and an output 9 for applying an intermediate frequency signal to an input 11 of an intermediate frequency amplifier 13.

An output 15 of the I.F. amplifier 13 is connected to an input 17 of a synchronous detector 19 another input 21 of which is connected to an output 23 of a picture carrier regenerator 25 an input 27 of which is connected to the output 15 of the I.F. amplifier 13.

In case of correct tuning of the oscillator 7 a demodulated television signal is produced at an ouput 29 of the synchronous detector 19 which inter alia includes a signal with the sound carrier frequency which is 5.5 MHz in many television systems. The amplitude of this signal is small in case of incorrect tuning of the oscillator 7 and large in case of correct tuning. This signal is applied to an input 31 of a filter 33 tuned to the sound carrier and an output 35 of said filter is connected to an input 37 of an amplitude detector 39 which provides a direct voltage at an output 41 which voltage is dependent on the tuning of the oscillator 7.

The output 41 of the detector 39 which constitutes a tuning detection circuit together with the filter 33 is connected to an operation signal input 43 of a change-over switch 45. An input of the change-over switch 45 is connected to the input 27 of the picture carrier regenerator 25 and another input 47 is connected to an output of an amplifier 49 an input of which is connected to an output 51 of a filter 53 tuned to the picture intermediate frequency and which has an input connected to an output 55 of the change-over switch 45.

The position of the change-over switch 45 shown corresponds to such a tuning of the oscillator 7 that a television signal occurring at the output of the I.F. amplifier 13 does not have the desired intermediate frequency and the tuning detection circuit 33, 39 still provides a too low voltage. In this position the input 27 of the regenerator 25 is connected to the output 55 of the change-over switch 45 and a picture carrier is obtained in a passive manner through the filter 53 which carrier is applied to the output 23 of the regenerator 25 and is used as a reference signal for the synchronous detector 19.

The picture carrier is not only applied to the output 23 but also to an output 57 of the regenerator 25. This output 57 is connected to an input 59 of a phase detector 61 a further input 63 of which is connected to the output 15 of the I.F. amplifier 13 and an output 65 of which is connected to a tuning signal input 67 of the filter 53.

When tuning the oscillator 7 which produces a sufficiently large operation signal at the output 41 of the tuning detection circuit 39, 33, the change-over switch 45 is set to the position not shown and an active picture carrier regenerator is obtained as a result of the continuous amplification on the picture carrier by the amplifier 49 and the filter 51 which are incorporated in a feedback loop through the input 47 to the output 55 of the change-over switch 45. The correct frequency and phase of the regenerated picture carrier is then obtained with the aid of the phase detector 61 correcting the tuning of the filter 53.

When receiving a signal having a too large deviation of the intermediate frequency relative to the desired frequency the picture carrier regenerator 25 is then passive and in case of a small deviation it is active.

In the circuit arrangement of FIG. 2 an I.F. television signal is applied to an input 201 of a transformer 203. This signal is passed on in phase opposition to the bases of two emitter followers 205, 207 so that I.F. television signals are present in phase opposition at outputs 209 and 211, respectively, of these emitter followers.

The signals at the outputs 209, 211 are subsequently applied to inputs 213, 215 of a synchronous detector 217 which then applies a synchronously detected television signal to an output 219, to the bases of two npn transistors 221, 223 constituting an emitter-coupled pair and to the bases of two npn transistors 225, 226 likewise constituting an emitter-coupled pair.

A direct current is applied to the emitters of the transistors 225, 226 by an npn transistor 227 arranged as a current source which direct current, dependent on the signal at the bases of the transistors 225, 226, is distributed over these transistors and is applied to the emitters of npn transistor pairs 228, 229 and 231, 233, respectively.

The bases of the transistors 231, 229 receive a signal originating from an output 235 of a 90° phase shifting circuit 237 an input 239 of which is connected to the emitter of an npn transistor 241 arranged as an emitter follower whose base is connected through a resistor 243 to the collector of the transistor 221.

The transistors 225, 226, 227, 228, 229, 231, 233 and the phase shifter 237 constitute a phase detector which produces direct voltages at the collectors of the transistors 228, 231 and 229, 233 which direct voltages are dependent on the phase difference between the signal at the bases of the transistors 225, 226 and the signal at the bases of the transistors 229, 231 and which change in the opposite sense in case of variation of the said phase difference. These direct voltages are applied to the bases of two npn transistors 245, 247 and to the bases of two npn transistors 249, 251.

The transistors 245, 247 constitute a polarity correction circuit. Their interconnected emitters are connected to ground through a resistor 253 and are furthermore connected to the base of an npn transistor 255. The base of this transistor 255 thus receives a voltage which has a minimum in case of absence of a phase difference between the signals at the input 239 and at the bases of the transistors 225, 226 of the phase detector and which increases as the phase difference increases or decreases because then either the transistor 245 or the transistor 247 starts conducting.

The transistor 255 is emitter-coupled to an npn transistor 257 whose base is connected to a fixed voltage. The emitters of the transistors 255, 257 are fed by an npn transistor 259 arranged as a direct current source.

When the voltage across the resistor 253 has its minimum, the transistor 255 is cut off and the transistor 257 is conducting. When the voltage across the resistor 253 increases, the transistor 255 starts to conduct and the transistor 257 is cut off.

The collector of the transistor 255 is connected to the interconnected emitters of the transistors 221, 223 while the collector of the transistor 257 is connected to the interconnected emitters of two npn transistors 271, 273 whose collectors are connected to those of the transistors 221, 223 and the bases are connected to a tap on the emitter resistors of two transistors 275, 241 arranged as emitter followers. The base of the transistor 275 is connected through a resistor 277 to the collectors of the transistors 223, 273.

When the transistor 255 conducts, the transistors 221, 223 conduct and the transistors 271, 273 are cut off. An I.F. signal at the inputs 209, 211 is then amplified by the transistors 221, 223 and a voltage is produced across a filter constituted by a parallel circuit 279 tuned to the picture intermediate frequency while the picture intermediate frequency component stepped up by the circuit exhibits a phase shift relative to the voltage at the bases of the transistors 221, 223 which is dependent on the frequency of this component and is thus dependent on the tuning of the oscillator (not shown) of the receiver. This component is passed on through the emitter follower 241 to the input 239 of the phase detector which, as described above, developes a voltage at the base of the transistor 255 which is dependent on this tuning. The transistor 255 will be cut off and consequently the transistors 221, 223 will be cut off when this tuning has sufficiently closely approached the desired tuning. The transistor 257 will then start to conduct and as a result the transistors 271, 273 will become conducting. An active oscillator circuit is then produced because the voltage across the parallel circuit 279 is fed back through the emitter followers 241, 275 and the transistors 271, 273 to this parallel circuit. The frequency and phase of the voltage generated by this oscillator circuit across the parallel circuit 279 is controlled by the transistors 249, 251 which develop an extra alternating voltage across the parallel circuit 279. This extra alternating voltage is produced by an npn transistor 281 arranged as an alternating current source in the coupled emitters of the transistors 249, 251 and the base of this transistor 281 is controlled by a voltage obtained from the output 235 of the 90° phase shifter 237. This extra alternating voltage depends in amplitude and polarity on the direct voltage difference at the bases of the transistors 249, 251 which is provided by the phase detector 225, 226, 227, 228, 229, 231, 233, 237 which in turn depends in amplitude and polarity on the phase difference between the voltage across the parallel circuit 279 and the voltage at the output 209, 211 of the emitter followers 205, 207. This extra alternating voltage thus automatically corrects the frequency and phase of the carrier generated by the circuit in the active oscillator state.

The voltage across the parallel circuit 279 is furthermore applied through the emitter followers 241, 275 as a reference signal to inputs 283, 285 of the synchronous detector 217.

In this second embodiment the phase detector 225, 226, 227, 228, 229, 231, 233, 237 together with the polarity correction circuit 245, 253 is used as a tuning detection circuit and the circuit including the transistors 255, 257 is used as a change-over switch from the passive to the active state of the regenerator circuit.

It will be evident that other methods of tuning detection and change-over can be used without passing beyond the scope of this invention.

What is claimed is:

1. A television receiver including a synchronous detector coupled to an output of an I.F. section and to an output of an I.F. picture carrier regenerator, the I.F. picture carrier regenerator comprising a change-over switch for changing over from an active to a passive regeneration state of the picture carrier regenerator and conversely, a picture carrier filter coupled to said change-over switch, and an amplifier coupled between said picture carrier filter and said change-over switch, an operation signal input of said change-over switch being coupled to an output of a tuning detection circuit, said tuning detection circuit providing a signal rendering the picture carrier regenerator passive in case of a large deviation of the intermediate frequency of a received signal relative to the desired frequency and provides a signal rendering the picture carrier regenerator active in case of a small deviation.

2. A television receiver as claimed in claim 1, wherein the tuning detection circuit comprises a phase detector which is coupled to an output of the I.F. section of the receiver, an output of said phase detector being coupled through a polarity correction circuit to the operation signal input of the changeover switch.

* * * * *

UNITED STATES PATENT AND TRADEMARK OFFICE
CERTIFICATE OF CORRECTION

PATENT NO. : 3,962,533
DATED : June 8, 1976
INVENTOR(S) : Karl Frans Nickl Von Nikelsberg It is certified that error appears in the above-identified patent and that said Letters Patent are hereby corrected as shown below:

IN THE TITLE PAGE below "Foreign Application Priority Data" change "6381" to

-- 7306381 --;

Signed and Sealed this

Sixteenth Day of November 1976

[SEAL]

Attest:

RUTH C. MASON
Attesting Officer

C. MARSHALL DANN
Commissioner of Patents and Trademarks